US011958076B2

(12) United States Patent
Hol et al.

(10) Patent No.: US 11,958,076 B2
(45) Date of Patent: Apr. 16, 2024

(54) SEPARATOR AND METHOD OF SEPARATING

(71) Applicant: PHARMAFILTER B.V., Amsterdam (NL)

(72) Inventors: Alex Hol, Beuningen (NL); Eduardo Alexander Van Den Berg, Amsterdam (NL)

(73) Assignee: Stichting IP & Know How Pharmafilter, Amsterdam (NL)

( * ) Notice: Subject to any disclaimer, the term of this patent is extended or adjusted under 35 U.S.C. 154(b) by 46 days.

(21) Appl. No.: 17/600,306

(22) PCT Filed: Apr. 1, 2020

(86) PCT No.: PCT/NL2020/050220
§ 371 (c)(1),
(2) Date: Sep. 30, 2021

(87) PCT Pub. No.: WO2020/204711
PCT Pub. Date: Oct. 8, 2020

(65) Prior Publication Data

US 2022/0212233 A1 Jul. 7, 2022

(30) Foreign Application Priority Data

Apr. 1, 2019 (NL) ...................................... 2022846

(51) Int. Cl.
*B07B 1/38* (2006.01)
*B07B 1/36* (2006.01)

(52) U.S. Cl.
CPC .................. *B07B 1/38* (2013.01); *B07B 1/36* (2013.01); *B07B 2230/01* (2013.01)

(58) Field of Classification Search
None
See application file for complete search history.

(56) References Cited

U.S. PATENT DOCUMENTS 2,194,721 A * 3/1940 Piper .......................... B07B 1/38 209/415
2,676,706 A * 4/1954 Temple ...................... B07B 1/08 209/315
(Continued)

FOREIGN PATENT DOCUMENTS

BE 452537 A 11/1943
EP 2188069 5/2010
(Continued)

OTHER PUBLICATIONS

International Searching Authority of WIPO; International Search Report for international PCT application PCT/NL2020/050220 dated Jun. 26, 2020.
(Continued)

*Primary Examiner* — Joseph C Rodriguez
(74) *Attorney, Agent, or Firm* — McDonnell Boehnen Hulbert & Berghoff LLP

(57) ABSTRACT

The present disclosure relates to a separator (100) and method of separating a waste stream (120) comprising liquid constituents, small-sized solid constituents and large-sized solid constituents into a first waste stream (121) substantially comprising the large-sized solid constituents and a second waste stream (122) substantially comprising a mixture of liquid and the small-sized solid constituents. The present disclosure also relates to a waste handling system (1) comprising such separator (100).

18 Claims, 5 Drawing Sheets

(56) References Cited

U.S. PATENT DOCUMENTS

| | | | | | |
|---|---|---|---|---|---|
| 2,848,110 | A * | 8/1958 | Hurst | B07B 1/38 184/6 |
| 3,504,793 | A * | 4/1970 | More | B07B 1/08 209/409 |
| 3,899,417 | A * | 8/1975 | Morris | B07B 1/38 209/318 |
| 4,875,999 | A * | 10/1989 | Haight | B07B 13/04 209/245 |
| 5,100,539 | A * | 3/1992 | Tsutsumi | B07B 1/42 209/240 |
| 5,213,216 | A * | 5/1993 | Suehiro | B07B 1/526 210/414 |
| 5,799,799 | A * | 9/1998 | Alamzad | B07B 1/42 209/381 |
| 2012/0024764 | A1* | 2/2012 | Krush | B07B 1/54 209/326 |
| 2022/0212233 | A1* | 7/2022 | Hol | B07B 1/38 |

FOREIGN PATENT DOCUMENTS

| | | | |
|---|---|---|---|
| EP | 2188069 | B1 | 6/2011 |
| EP | 3015750 | A2 | 5/2016 |
| EP | 2859952 | B1 | 6/2017 |
| WO | 2006/084655 | A1 | 8/2006 |
| WO | 2007/071245 | A2 | 6/2007 |
| WO | 2009/035317 | A1 | 3/2009 |

OTHER PUBLICATIONS

International Searching Authority of WIPO; Written Opinion for international PCT application PCT/NL2020/050220 dated Jun. 26, 2020.

* cited by examiner

SEPARATOR AND METHOD OF SEPARATING

The present disclosure relates to a separator and method of separating a waste stream comprising liquid constituents, small-sized solid constituents and large-sized solid constituents into a first waste stream substantially comprising the large-sized solid constituents and a second waste stream substantially comprising a mixture of liquid and the small-sized solid constituents. The present disclosure also relates to a waste handling system comprising such separator.

Examples of waste treatment systems, for instance waste treatment systems for treating medical waste generated in a building such as a hospital, are provided in documents EP 2 188 069 B1 and EP 2 859 952 B1. Both documents describe various examples of waste treatment systems for handling a plurality of waste flows generated at different locations in the building. The waste flows may pass a shredder for shredding the waste before they are provided to the separator. Each waste flow comprises at least a first waste portion which substantially comprises of at least one of feces, urine, medicinal and/or toxic substances, and a second waste portion which substantially comprises items including containers for holding the first waste portion and other items, like unwanted objects that have been erroneously supplied to the waste handling system, such as towels or tissues disposed of by the users of the building, etc. The other (unwanted) objects may be objects of a type that cannot be shredded by shredders and therefore maintain a very large size. When these objects are handled by the separator, the objects may get blocked inside the housing thereof and may reduce the separating efficiency of the separator or even completely clog the separator.

A waste stream separator per se is known from WO 2007/071245 A2 however, such a separator may accumulate waste in, on and/or near the separator resulting in blocking of the separator. As such, such a separator may require high maintenance and may therefore be inefficient.

Document U.S. Pat. No. 2,848,110 discloses a machine for separating powdered solids or straining material out of liquids. The known machine is unsuited for separating a waste stream containing the relatively large objects such as towels or tissues disposed of by users in a building. The relatively large objects are likely to get blocked inside the housing so that the separating efficiency of the machine is reduced. A further drawback of the known machine is that the drive construction for driving the vibration of the sieves is complex, prone to wear and/or involves high maintenance costs. This has a negative effect on the overall costs for handling the waste stream.

Document BE 452537 A discloses a circular sieve device for grading of mud and dust particles and is equally unsuitable for separating the above-mentioned waste stream, especially when the large-sized objects are of a type that cannot easily be shredded, like towels and tissues.

It is an object of the present disclosure to provide a separator for separating a waste stream comprising liquid constituents, small-sized solid constituents and large-sized solid constituents into a first waste stream substantially comprising the large-sized solid constituents and a second waste stream substantially comprising a mixture of liquid and the small-sized solid constituents, in a more efficient manner, preferably by reducing the probability of blockage of the separator due to accumulation of waste in, on and/or near the separator.

It is another object of the present disclosure to provide a more efficient treatment of a waste stream, as a result of which the costs for handling waste can be reduced without compromising hygiene.

It is yet another object of the present disclosure to make the treatment of waste streams more hygienic.

According to a first aspect of the present disclosure there is provided a separator for separating a waste stream comprising liquid constituents, small-sized solid constituents and large-sized solid constituents into a first waste stream substantially comprising the large-sized solid constituents and a second waste stream substantially comprising a mixture of liquid and the small-sized solid constituents, the separator comprising:

- a base;
- a housing fixedly connected to the base, the housing comprising an inlet for supply of the waste stream to be separated, a first outlet for discharge of the first waste stream and a second outlet for the discharge of the second waste stream;
- a vibrating mesh screen arranged inside the housing downstream of the inlet for receiving on its mesh screen surface the waste stream to be separated, wherein the mesh screen is configured to be vibrated in order to move the waste stream over the mesh screen surface, wherein the mesh size of the vibrating mesh screen is selected to allow passage of the liquid and small-sized solid constituents towards an receptacle inlet opening and to move the large-sized solid constituents over the mesh screen surface towards the peripheral edge of the screen;
- a vibrating receptacle arranged inside the housing downstream of the mesh screen and connected to the mesh screen, the receptacle comprising a receptacle inlet opening and a receptacle passage for receiving the second waste stream having passed the mesh screen and for guiding the same towards the second outlet, respectively;
- a vibrating support fixedly connected to the vibrating receptacle, the support being spring-mounted on the base;
- a drive unit mounted to the vibrating support, the drive unit being configured to induce vibration to the support and to the receptacle and screen connected thereto;
- a collector arranged inside the housing downstream of the screen, the collector comprising a collecting surface for collecting the large-sized solid constituents of the first waste stream and discharging the same towards the first outlet;

wherein the vibrating mesh screen is sized and positioned to provide a gap between the peripheral edge of the vibrating mesh screen and a side wall of the housing connected to the base, allowing the large-sized solid constituents of the first waste stream to drop onto the collecting surface of the collector.

The mixture of liquid and small-sized solid constituents may be any liquid or liquid-like material such as water, urine, disposal water, gels or other liquid-like material in combination with solid-like material such as toilet-paper, pulp, disposals, non soluble items, or other solid-like materials. The large-sized solid constituents may be any item including a container for holding the first waste portion (wherein the container may be in its original shape or shredded to form individual pieces of container material) and/or other items. The other items may be items that cannot be shredded by the one or more shredding devices, such as towels, tissues, (food) packages and similar objects, and therefore keep a relatively large size.

In an embodiment the gap extends along the entire screen edge to allow the large-sized solid constituents to drop from the screen at any position along the peripheral edge thereof.

In an embodiment the mutually connected screen, receptacle and support are arranged to be vibrateable with respect to the stationary base and housing fixedly connected thereto. The base (and the housing connected thereto) is stationary or in essence non-movable and is supported on any surface, such as a floor.

In an embodiment the vibrating screen, vibrating receptacle and vibrating support are freestanding relative to the housing.

In an embodiment the vibrating mesh screen is mounted in the housing in a manner allowing the vibrating mesh screen to vibrate freely in transversal direction, without the mesh screen edge making contact with the side wall of the housing.

In an embodiment the collector and its collecting surface are fixedly connected to the housing and/or free from connection with the screen, vibrating receptacle and vibrating support.

In an embodiment the drive unit is configured to cause the screen, receptacle and support to vibrate in both an transversal vibration motion and an axial vibration motion.

In an embodiment the housing is essentially cylindrical and the mesh screen is arranged to extend essentially orthogonally with respect the cylinder axis. In cases wherein the housing has a circular cross-section, the gap may be an annular opening bordering the inner surface of the housing.

In an embodiment the separator comprises a support connected to the receptacle, wherein a drive unit is mounted to the support, the drive unit further being configured to induce vibration to the support and to the receptacle and screen connected thereto, thereby inducing vibration of the screen.

In an embodiment the support is spring-mounted on a base, wherein the housing preferably is fixedly connected to the base.

In an embodiment the screen is configured to substantially block the large-sized solid constituents in the waste stream to be separated, while allowing liquid and small-sized solid constituents to go through.

In an embodiment the drive unit comprises an electric motor and a rotatable drive shaft, wherein a first and second eccentrically arranged weights are connected to the drive shaft so as to cause the vibration when the drive unit is activated. In a further embodiment the drive unit is configured to vibrate the screen to urge the waste material arriving from the inlet to move in an outward radial direction. The drive unit may also be configured to vibrate the screen to additionally urge the waste material to move in a circumferential direction.

In an embodiment the screen is mounted in the housing in a manner allowing the screen to vibrate freely in transversal direction, without the mesh screen edge making contact with the side wall of the housing. The screen may be configured to be free-standing, more specifically free standing from the wall of the housing.

As mentioned above, the waste stream may comprise at least a mixture of feces, urine, medicinal substance and/or toxic substance, and large-sized solid constituents formed by containers or shredded container material.

In an embodiment the receptacle is fixedly connected to the support only at the bottom portion of said receptacle, wherein vibration of the support is caused by said drive unit connected thereto. The support may have a plate-like structure, for instance a curved plate-like structure to guide the waste towards an outlet.

The receptacle may be connected to the support element using a frame, the frame preferably comprising at least three rods extending in the axial direction of the receptacle to thereby connect the support to the receptacle.

In embodiments of the present disclosure the collecting surface of the collector is arranged to surround the receptacle downstream of the mesh screen, wherein the collecting surface is preferably mounted to the housing wall and/or preferably extends obliquely relative to the axial direction.

In other embodiments the upper portion of the receptacle has a greater radial cross-section than a radial cross-section of a lower portion of the receptacle.

According to a second aspect of the present disclosure there is provided a waste handling system comprising a separator as defined herein, the waste handling system being arranged or to be arranged in a building, such as a care institution, for treating a number of different waste flows generated at different locations in the building, wherein each waste flow comprises at least a first waste portion which substantially comprises of at least one of feces, urine, medicinal and/or toxic substances, and a second waste portion which substantially comprises items including containers for holding the first waste portion and other items, the waste handling system comprising:

- a conduit system with a number of waste inlets which can be arranged at different locations in the building for receiving the waste flows;
- one or more shredding devices connected to each of the waste inlets for shredding the items of the second waste portions to provide large-sized solid constituents, the shredding devices having outlets for discharging the first and second waste portions of the waste flows;
- a separator, wherein the inlet of the separator is connected to the outlets of the shredding device, wherein the separator is configured to separate the resulting large-sized solid constituents from the liquid and small-sized solid constituents, the large-sized solid constituents being discharged towards the first outlet and the liquid and small-sized constituents being discharged towards the second outlet;
- at least one of a first cleaning device being connected to the first outlet of the separator for cleaning at least a part of the first waste stream and a second cleaning device being connected to second outlet of the separator for cleaning at least a part of the second waste stream.

As mentioned before, the other items might include items that cannot be shredded by the one or more shredding devices, such as towels, tissues, (food) packages etc.

According to a third aspect of the present disclosure there is provided a method of separating a waste stream comprising liquid constituents, small-sized solid constituents and large-sized solid constituents into a first waste stream substantially comprising the large-sized solid constituents and a second waste stream substantially comprising a mixture of liquid and the small-sized solid constituents, the method comprising:

- supplying the waste stream into the inlet of a housing;
- receiving the waste stream onto a mesh screen surface of a vibrating mesh screen arranged inside the housing downstream of the inlet, the vibrating causing the movement of the waste stream over the mesh screen surface, wherein the mesh size of the vibrating mesh screen is selected to allow passage of the liquid and small-sized solid constituents towards an receptacle inlet opening and to move the large-sized solid constituents over the mesh screen surface towards the peripheral edge of the screen;

receiving the liquid and small-sized solid constituents passed through the mesh screen through a receptacle inlet opening of a receptacle arranged inside the housing downstream of the mesh screen and connected thereto guiding the received liquid and small-sized solid constituents through a receptacle passage inside the receptacle towards the second outlet;

collecting the large-sized solid constituents of the first waste stream on a collecting surface of a collector arranged inside the housing downstream of the screen;

discharging the collected large-sized solid constituents of the first waste stream towards the first outlet.

In accordance with aspects of the present disclosure the first waste stream may fall from the screen at any position along the peripheral edge thereof such that accumulation of material of the first waste stream on or near the screen is prevented. Such blocking may otherwise occur if, for example, relatively large items are comprised in the first waste stream. Said large items may be relatively large compared to, for example, a discharge conduit for the first waste stream. For example, a raised border (for instance formed by the side wall of the housing) may encircle the peripheral edge of a vibrating separator wherein a discharge conduit is arranged. Substances that are blocked by the screen will be transported along the raised border to be carried off by the discharge conduit. However, if the inlet area of the discharge conduit is relatively small compared to the size of large items in the first waste stream, such relatively large items may block the inlet of the discharge conduit, thereby causing other items of the first and/or second waste stream to accumulate which may further block the inlet of the discharge conduit. In some cases, the screen may be blocked if the inflow of a waste stream is not stopped, resulting in an overflow of waste which may be undesirable. If the waste stream is stopped, the separator is not operated and may need manual cleaning which may also be undesirable.

As described above, the separator may comprise a housing wherein the receptacle is mounted, wherein a gap between the receptacle and the housing may be formed along the entire peripheral edge of said screen to thereby allow the solid-like waste to fall from said screen at any position along the peripheral edge thereof. Thereby the abovementioned effect may be achieved. For example, if a upper portion, where screen is covering the receptacle, of the receptacle would be connected to the housing by e.g. a connection rod, material in the first waste stream such as, as a non-limitative example, a cloth may be suspended over such a rod, which may result in accumulation of material of the first and/or second waste stream. Further, the housing may prevent undesirable gasses, liquids, smells, violates, small particles and the like from escaping the separator.

The receptacle may be fixedly connected to the support only at the bottom portion of said receptacle, wherein vibration of the support is caused by said drive unit connected thereto. Since the receptacle may be mounted only at the bottom portion thereof, the upper end of the receptacle may not be joined in a way such that it may block items in the first waste stream.

The drive unit may comprise a drive shaft, wherein on the drive shaft various weights may be eccentrically mounted, thereby causing the vibration when the drive unit may be activated, and wherein vibration of the support. The eccentrically mounted weights may preferably be arranged at an angle with respect to each other as known in the art to thereby cause a vibration of the screen that is both substantially circular in the plane of the screen as well as substantially linear in the direction perpendicular to the screen. The former vibration forcing material on the screen to be transported to the edge thereof, the latter vibration forcing material on the screen to be forced in the direction perpendicular to the screen, by this joined vibrations material on the screen may either fall through the screen or be transported to the peripheral edge of the screen.

The weights on the drive shaft may be mounted in a manner wherein an elongated axis of the first weight and an elongated axis of the second weight are arranged at an angle as seen in the axial direction of the drive shaft. This angle may be referred to as the lead angle. The lead angle may be configured to cause a vibration of the screen, for example through the receptacle, mounted to the drive shaft through the support and optional frame. Wherein the vibration of the screen may be a recurrent vibration with a circular motion in the plane parallel to the surface of the screen and/or may have recurrent vibration with a motion that is substantially perpendicular to the surface of the screen.

The support may have a plate-like structure. Preferably, the first waste stream is incident on the support which may be mounted in the downstream direction of the receptacle. Furthermore, the receptacle may be connected to the support element using a frame. This frame is preferably configured to provide sufficient structural integrity to transfer vibrations induced in the support to the receptacle and the screen arranged thereon. To this end the frame may comprise at least three rods extending in the axial direction of the receptacle to thereby connect the support to the receptacle. E.g. the frame may be a T-shaped frame, a cross-shaped frame and the like as seen in the axial direction of the separator.

The separator may further comprise a collector having at least one collecting surface surrounding the screen for collecting the first waste stream, wherein the collecting surface is at least partially arranged downstream the screen or, preferably, fully arranged downstream of the screen. Since the collecting surface may be arranged downstream of the screen, the screen may be freely mounted in the radial direction thereof, which may further facilitate the abovementioned advantages. Further, the collecting surface may arranged so as to extend obliquely relative to the axial direction. In other words, the orientation may be oblique with respect to the direction of gravity such that material of the first waste stream may tends to be transported to a lower portion of the collecting surface to be collected there.

The separator may further comprise a first outlet that is connected to the collecting surface, which may be configured to guide the first waste stream. For example, the outlet may be mounted on a lower portion of the collecting surface if obliquely mounted such that the material of the first waste stream tends to be transported to the first outlet.

The upper portion of the receptacle may have a greater radial cross-section than a radial cross-section of a lower portion of the receptacle, thereby the screen may have a relatively large radial cross-section to thereby increase the allowable throughput of the separator. The reduced lower portion of the receptacle may be arranged in the proximity of, for example directly adjacent to, the collecting surface, thereby the volume available for the first waste stream may be relatively large thereby increasing the throughput capacity of the separator for the first waste stream.

The separator may be configured to collect the second waste stream in the receptacle which is connected to a second outlet. Thereby the first outlet and the second outlet may provide separated waste streams of the first waste stream and the second waste stream, respectively.

In a further embodiment the second outlet comprises a vent for allowing air into the second outlet to thereby increase the flow speed of the second waste stream in the second outlet.

The screen may be mounted on the receptacle using a strap and a locking mechanism. Hereby the screen may be removably mounted on the receptacle. Likewise, in some embodiments, the housing may be formed by a plurality of stages wherein the stages are joined with straps and a locking mechanism. This may be beneficial for inspection, maintenance and/or assembly purposes.

In some embodiments, one or more further screens may be present arranged downstream of the receptacle in order to split the second waste stream into a plurality of sub waste streams.

As a non-limitative example, the first waste stream may predominantly comprise solid constituents having at least one dimension larger than 2 cm (in this non-limitative example corresponding to the size of the holes in the screen (so-called mesh size of the mesh screen), the second waste stream may predominantly comprise liquid like waste and waste having at least one dimension smaller than 2 cm (in this non-limitative example corresponding to the size of the holes in the screen). Therefore a one-step fine filtering of the supplied waste stream may be achieved in an easy and reliable manner. Further filtering (i.e. further separating in waste streams of different particle size) is generally not needed, allowing the resulting waste streams to be directly handled further, without additional filtering step. In principle it may however be possible to split either or both of the resulting first and second waste streams in two or more waste substreams. For instance, the second waste stream may be split in a first sub waste stream, not passing through a further screen, wherein the first sub waste stream may predominantly comprise material having at least one dimension larger than 1 cm (in this non-limitative example corresponding to the size of the holes in the further screen), while the second sub waste stream may predominantly comprise liquid like waste and waste having at least one dimension smaller than 1 cm (in this non-limitative example corresponding to the size of the holes in the further screen).

The screen may comprise a mesh or mesh-like structure. For example, the mesh-like structure may be a metal-like structure comprising a plurality of holes with a size that is optimized for separating the first and second waste streams, i.e. substantially blocking material of the incident waste stream that is to constitute the first waste stream while substantially allowing material of the incident waste stream that is to constitute the second waste stream through said holes.

The support may be curved and configured for receiving the second waste stream from the receptacle. The second outlet may be connected to a lower portion of the support to allow the material of the second waste stream to flow there under the influence of gravity.

The separator may comprise a water inlet in the housing to allow washing of the separator. For example, a water inlet may be present to allow water into the housing onto the receptacle, the screen, the collecting surface and/or the first outlet to clean the surfaces that are, during operation of the separator, in contact with material of the first waste stream.

DETAILED DESCRIPTION OF THE DRAWINGS

Figure 1:
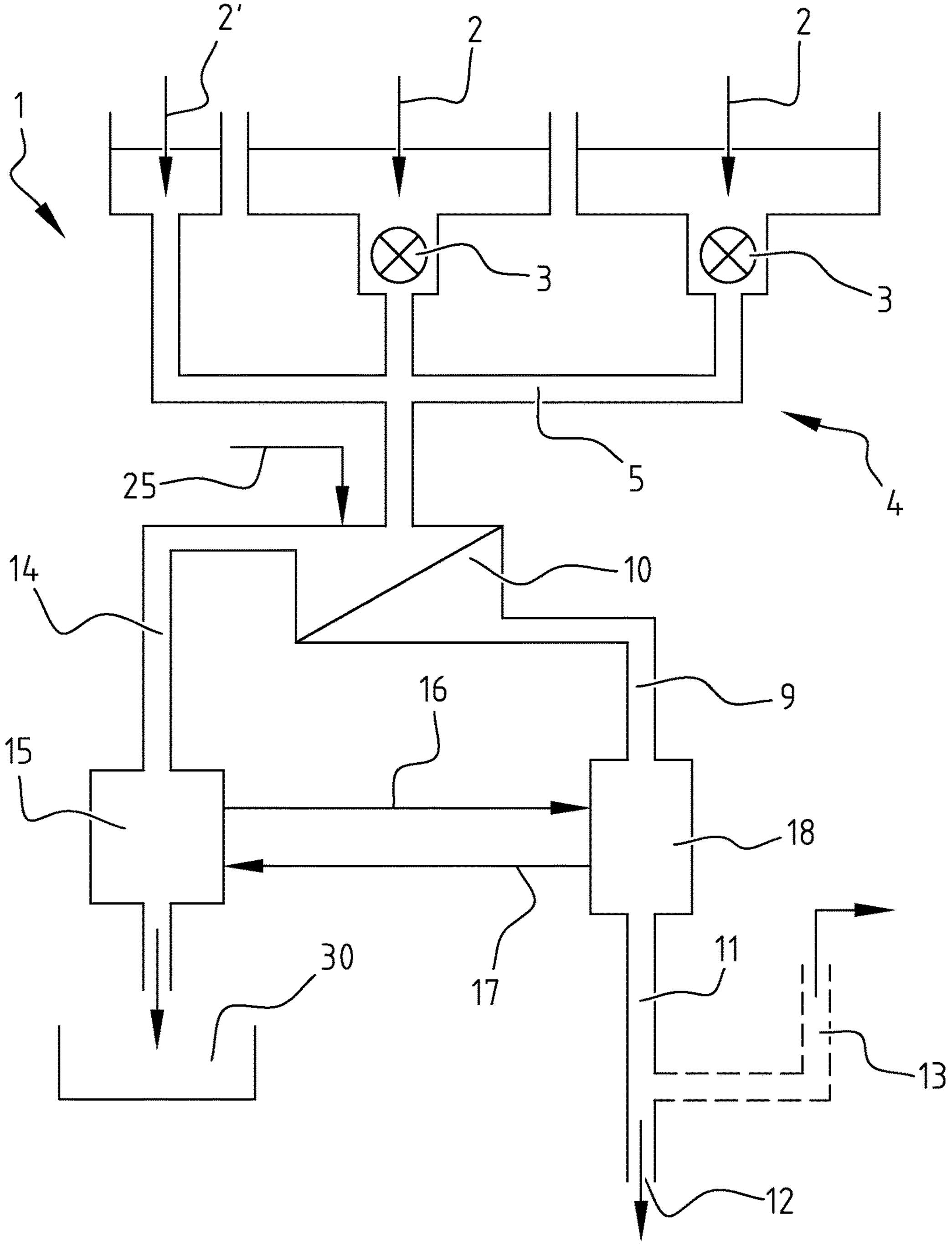
FIG. 1 diagrammatically shows an embodiment of a waste treatment system including a separator used with (biodegradable and/or non-biodegradable) containers.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily obscuring the present disclosure.

As will be apparent to those of skill in the art upon reading this disclosure, each of the individual embodiments described and illustrated herein has discrete components and features which may be readily separated from or combined with the features of any of the other several embodiments without departing from the scope of the present disclosure. Any recited method can be carried out in the order of events recited or in any other order which is logically possible.

It is noted that, as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation.

The separator as described herein may be integrated and form part of a waste treatment system for treating a number of different waste streams. The waste treatment system may be integrated into a building, such as a care institution (for instance a hospital, nursing home or home for the elderly), an office building, an airport terminal, and the like) where waste flows are generated at many separate locations. The waste flows may be collected from the separate locations, treated (for instance, separated in a central separation device and cleaned in a central purification installation) and then be discharged. The waste flows are to greater or lesser extent liquid, so that they can be discharged via a public conduit system, for instance to the public sewer system. Solid substances (such as particles of diverse dimensions, items, like towels, tissues, (food) packages etc.) can also be present in the waste flows in addition to the liquid substances.

Examples of such a waste treatment system are described in documents EP 2 188 069 B1 and EP 2 859 952 B1, the contents of which being herein incorporated by reference. Both documents describe various examples of waste treatment systems for handling waste streams comprising solid constituents as well as liquid constituents. In particular, the waste streams may comprise at least one first waste stream which comprises substantially feces and urine and a second waste stream which comprises substantially waste placed in a container and comprising medicinal and/or toxic substances. The waste may also comprise pieces of larger sized waste, for instance towels or tissues disposed of by the users of the building.

FIG. 1 shows an exemplifying embodiment of a (medical waste) handling system 1 according to the present disclosure. The handling system 1 essentially corresponds to the systems described in respective FIGS. 1 of EP 2 188 069 B1 and EP 2 859 952 B1 and for further details of the system reference is made the both documents. The system 1 comprises a number of inlet units 2 where the waste can be presented by the users of the building. The inlet units are situated at different locations in the building, for instance in all bathrooms of a care institution. Shown in the figure are three inlet units, although this number can of course also be smaller or (much) greater. An inlet unit 2 comprises in the shown embodiment a housing in which a comminuting device or shredding device 3 may be arranged. A shredding device 3 may be provided in the inlet unit 2 for the purpose of shredding of possible solid substances in the waste. An example of such shredding device 3 is described in the above-mentioned EP documents and also in a further document EP 3 015 750 A2 the content of which being herein incorporated by reference as well.

As alternative or in addition to the inlet units with shredding devices, inlet units 2' can also be realized in which such a shredding device is not arranged. In these embodiments the waste is shredded elsewhere (so outside the inlet unit) or a shredding process is not performed, for instance in the case of a waste flow without solid substances. An inlet unit 2' free from any comminuting or shredding device may be the sink of a shower or a toilet enabling the waste to directly enter the handling system 1 without a shredding step.

Each of the inlet units 2,2' is coupled to a shared conduit system 4 along which the waste may be transported and in which it is further processed. The term “conduit” is understood here to mean any form of tube, shaft, duct, pipe and so on suitable for enabling transport of the waste through the building. The conduit system 4 may be formed by any combination of the above.

The conduit system 4 comprises a number of conduits 5 connected to one or more central separation devices 10. The central separation device 10 is arranged to receive the waste of inlet units 2,2'. In the central separating device 10 separation takes place between the liquid substances of the actual waste (for instance, water, urine, feces and the like) and the solid substances (for instance, container material of the shredded containers and/or other shredded objects, like towels, plates, boxes, drinking cups, medical waste, syringes and the like). Liquid, for instance water such as purified water from a liquid substances purification installation 18 supplied through conduit 13, may optionally be added to the separation device 10 via liquid supply 25.

The separated liquid substances (i.e. a waste stream primarily containing liquid substances) are fed via a conduit 9 of the conduit system 4 to a liquid substance purification installation 18. The liquid substances fed via conduit 9 (consisting largely of water) is purified in the purification installation 18 and subsequently discharged via discharge conduit 11 to sewer system 12. Optionally, the purified water can be reused (via conduit 13) or released to the surface water.

The liquid substance purification installation 18 may be configured to treat the incoming waste stream of primarily liquid substances by at least one of the following steps: passing the waste (preferably in the following order) through a membrane bioreactor (MBR), cleaning the waste using ozone, passing the waste through an active carbon filter, irradiating the waste with UV light, and subjecting the waste to a reverse osmose treatment. The resulting purified effluent may be discharged towards the sewer system 12. Also a part of the resulting waste stream can be treated further in a solid treatment device 15, as will be explained later.

At least a portion of the waste flow with solid substances, for instance with shredded container material, separated in separating device 10, is guided via a conduit 14 to a solid treatment device 15. The mixture of shredded solid substances, for instance shredded container material and/or other (shredded or non-shredded) solid material is received in the solid treatment device 15. The solid treatment device 15 is configured to treat the waste flow primarily containing solid substances, in one or more treatment steps, resulting in a solid residue 30. The treatment may involve a cleaning process of the shredded and/or non-shredded container/object material and/or other solid material. Additionally or alternatively, the treatment in the solid treatment device 15 involves a shredding process wherein one or more additional shredders (i.e. additional to shredding devices 3) shred the mixture further. In some embodiments the resulting mixture only contains very small solid objects, for instance objects having a diameter smaller than 1 cm. In certain embodiments liquid such as a flushing liquid made available at the outlet is admitted via conduit 13 to the solid treatment device 15 to assist in the treatment device. Furthermore, treatment liquid (for instance, treatment water (vapour)) released in the solid treatment by the solid treatment device 15 may be discharged from the solid treatment device 15 through a conduit 16 to the liquid substance purification installation 18. Similarly, solids (for instance, biomass) released in the liquid substance purification may be discharged from the liquid substance purification installation 18 via a conduit 17 to the solid treatment device 15. The solid treatment device 15 may be configured to treat the incoming waste stream of primarily solid substances by at least one of the following processes: (additional) shredding, hydrolyses, fermentation, de-hydration, decontamination and/or drying. The resulting treated solid substance or residue 30 is then discharged and transported for further handling.

In the known separation device the separation of the incoming waste flow may take place in a three-step separation operation: a first separation step in a so-called step screen device, a second separation step in a screw screen device, and a third separation step in a drum filter device.

This tree-step separation was considered necessary in the past because of the nature of the waste streams to be handled. The three-step separation, however, involves bulky and/or complex equipment, adding to the costs and reducing reliability of the known separation device. Furthermore, as mentioned above, the waste stream may comprise relatively large-sized objects such as towels, tissues, bed linen sets, flannels, that tends to eventually block or clog the known separation device.

Therefore a need exist to provide a handling system comprising a separation device that has a reduced likelihood of clogging or blocking, also in the presence of large sized objects. A further need exists to provide a more simple and reliable separation device, that preferably takes less floor space.

A separation device configured to perform a three-step separation tends to have a number of further disadvantages as well. For instance, the assembly and maintenance of the three devices for performing the three-step separation operation is relatively bulky and expensive, is complex and therefore prone to defects and has high maintenance costs. Furthermore, considerable effort must be put in controlling all three steps in the separation operation and the associated control software is relatively complex. Additionally, the energy consumption of the three-step separation operation is high. The need exists for a handling system that is compact, easy to maintain and/or easy to control, and/or has a low energy consumption.

In embodiments of the present disclosure the separation device 10 of the system 1 comprises one or more separators 100 of the type as described herein (cf. FIGS. 3-6).

Figure 2:
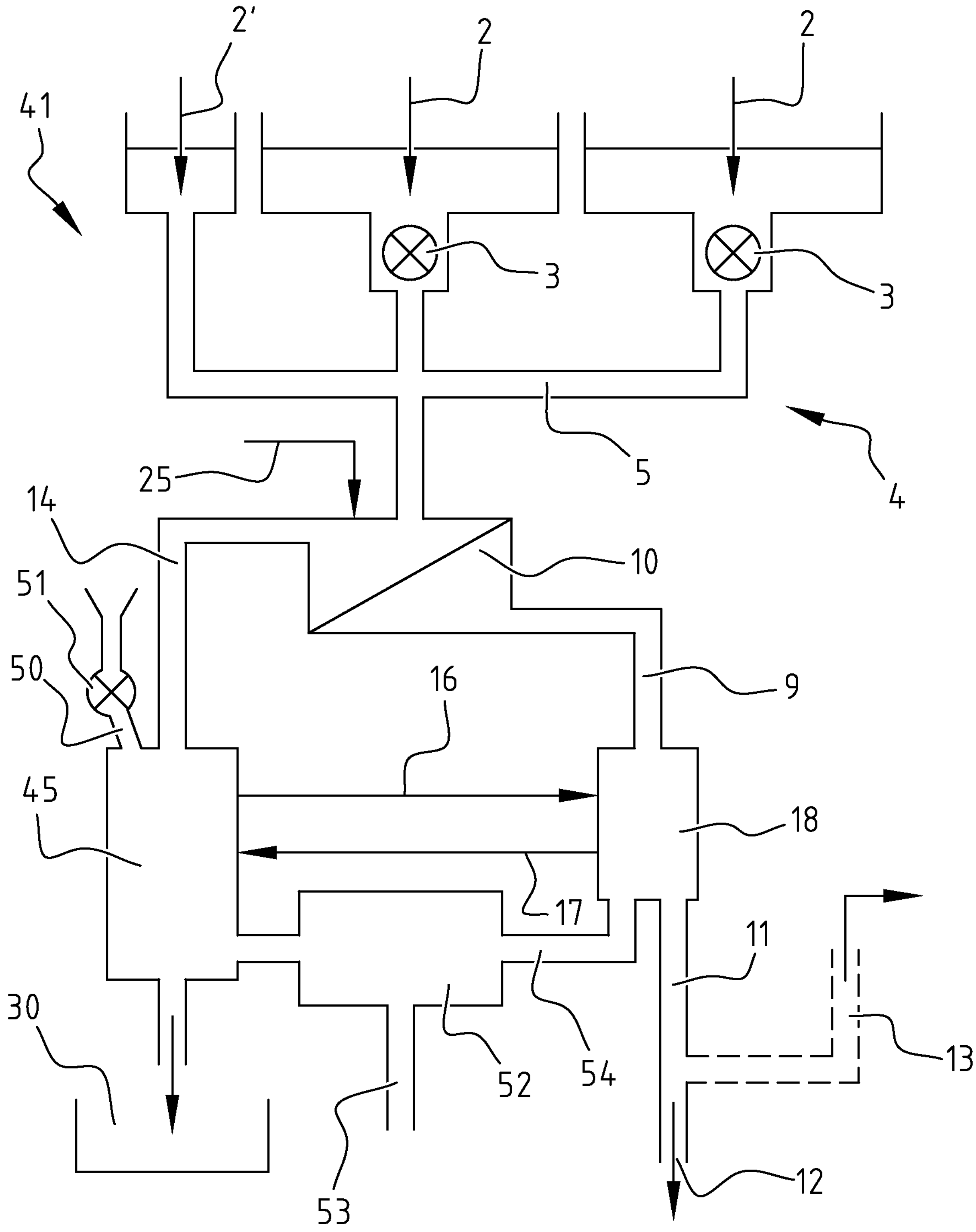
FIG. 2 diagrammatically shows a further embodiment of a waste treatment system including a separator used with (biodegradable and/or non-biodegradable) containers and additional biodegradable waste sources.

FIG. 2 shows a variant of the waste treatment system 41 wherein a separator 100 of the type as described herein is integrated as a separating device 10. In this case, waste is supplied via inlets 2,2' to the conduit system 4. Comparable to the embodiment of FIG. 1, the system 41 is able to handle a waste stream wherein the container portion of the waste comprises biodegradable types of material, such as paper-like types of material, biodegradable plastics, such as PLA plastics.

These biodegradable materials are comminuted in a comminuting or shredding device 3 in the manner described above and centrally fed to the separating device 10 where the liquid substances (i.e. the actual waste stream) is again separated from the solid substances, such as—but not limited to—comminuted container material. The liquid substances are fed to the purification installation 18 and the liquid which is released in the process is discharged via outlet 11 towards the sewer system 12 and/or to the conduit 13 in order to be re-used.

The (biodegradable) material of the shredded container which is separated from the liquid substances in the separating device 10 is initially treated in the manner described above in solid treatment device 45 similar to the solid treatment device 15 described above. The flushing water which is used and which may come from outlet 13 is again fed to the purification installation 18 in this case as well. The treated container material is fed to a fermenter forming part of the solid treatment device 45. Additionally, it is also possible to feed further external waste, such as kitchen waste, to this fermenter by means of inlet 50 and a further comminuting device 51. Optionally, a composting installation is included to provide for composting of the further external waste. Fermentation in the fermenter produces heat/gas, which heat/gas can be used for heating the fermenter and/or for generating power in order to promote the degradation process and the conditions for the micro-organisms in the fermenter. In the embodiment shown in FIG. 2 the solid/liquid waste stream is fed to a separator 52 where the hard components are filtered out and discharged in order to be composted 53. If desired, a heating step is also carried out in order to render any bacteria in the hard components harmless by heating. The softer components including the liquid are fed to the purification installation 18 via pipe 54.

Above, reference has been made to a waste stream obtained by comminuting a container which contains waste. However, the device described is not limited to treating only this type of waste stream. It is also possible to carry waste such as water originating from showers, toilets, kitchens, from input unit 2' or other waste, such as the relatively large sized objects mentioned earlier, along in the waste stream to be treated through the conduit 5.

Figure 3:
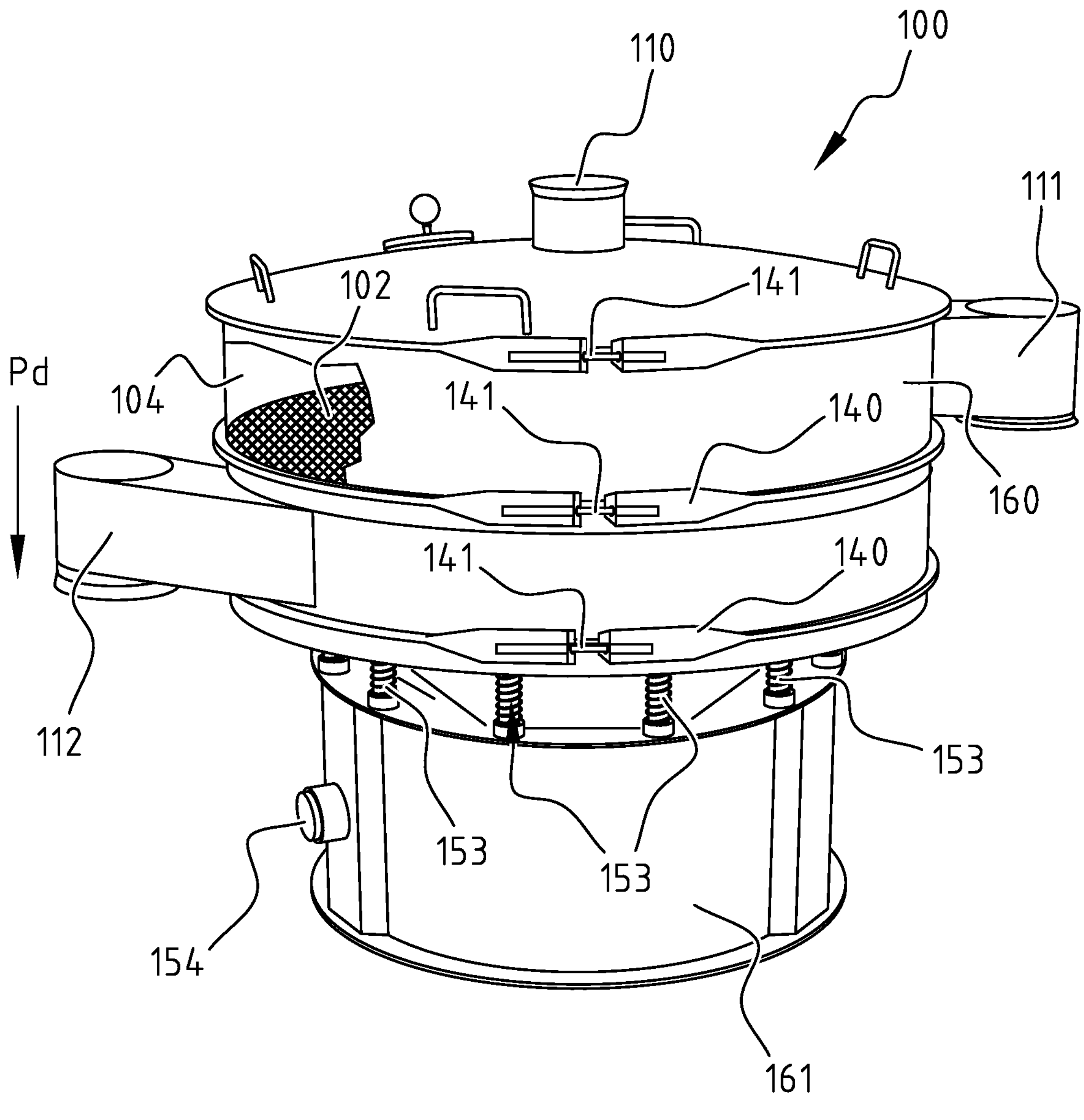
FIG. 3 is a partly-cut away view of a first embodiment of a separator.
Figure 4:
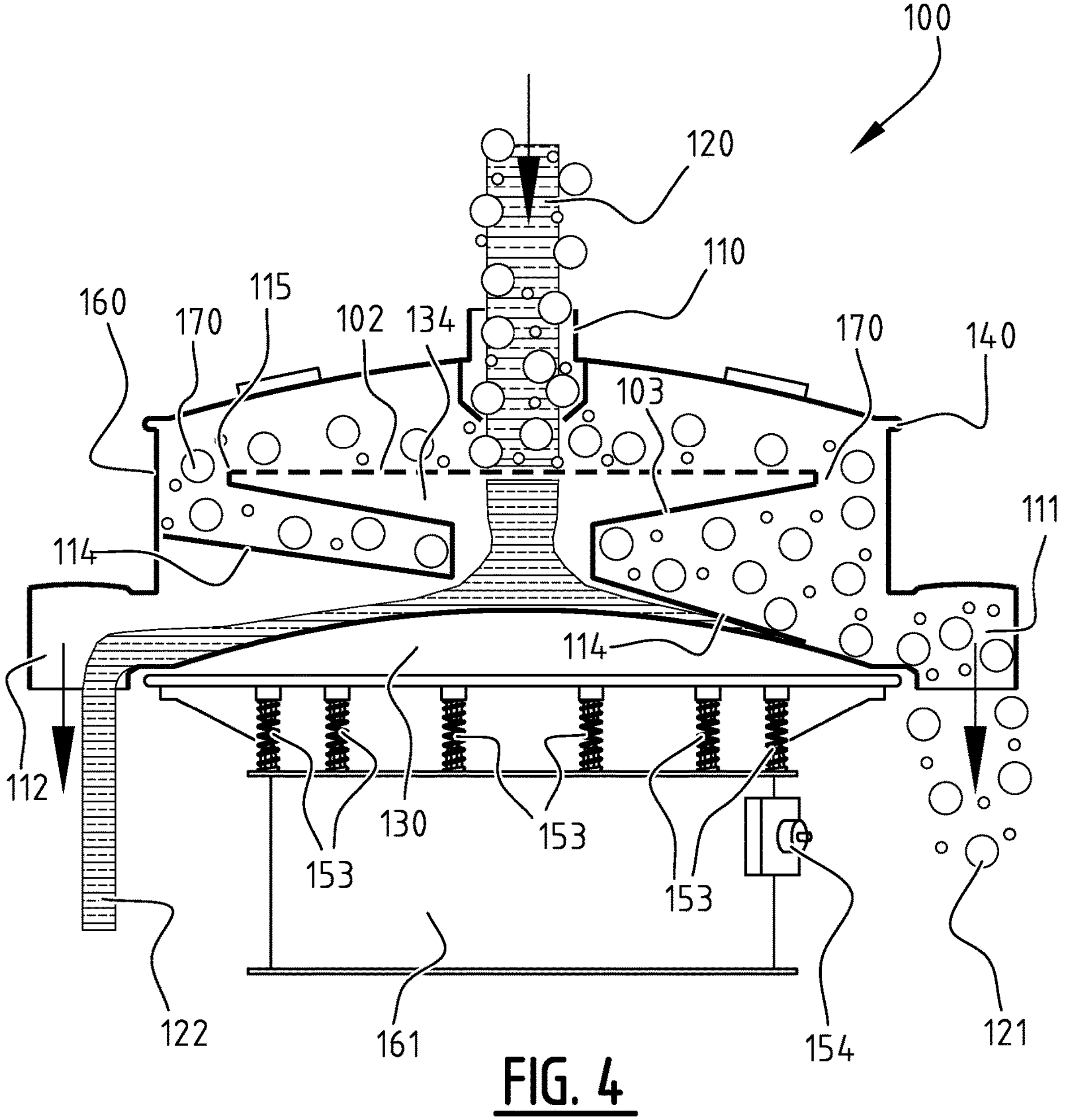
FIG. 4 is a schematic cross-section of a second embodiment of a separator according to the present disclosure.
Figure 5:
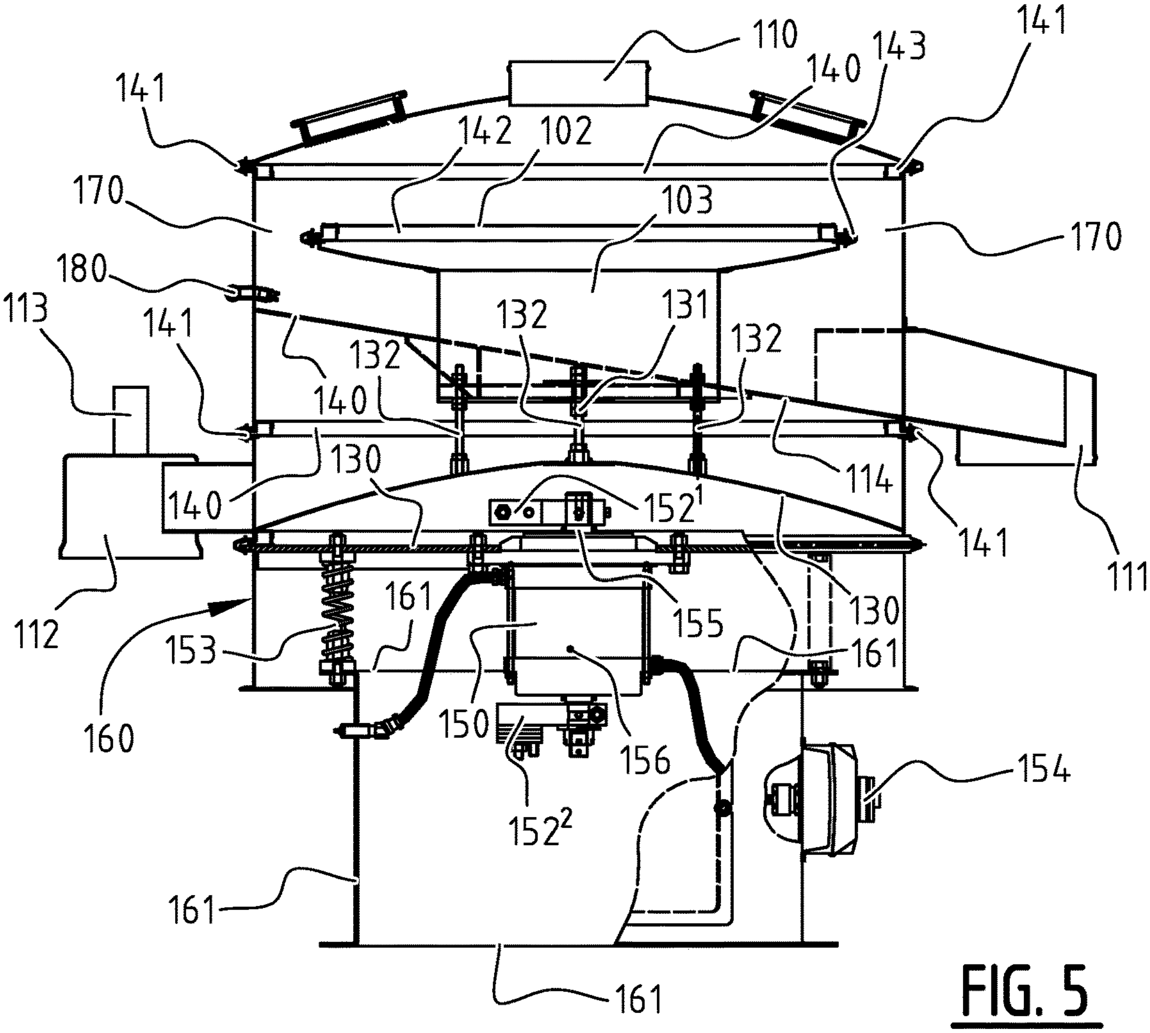
FIG. 5 is a cut-away side view of the second embodiment of the separator.
Figure 6:
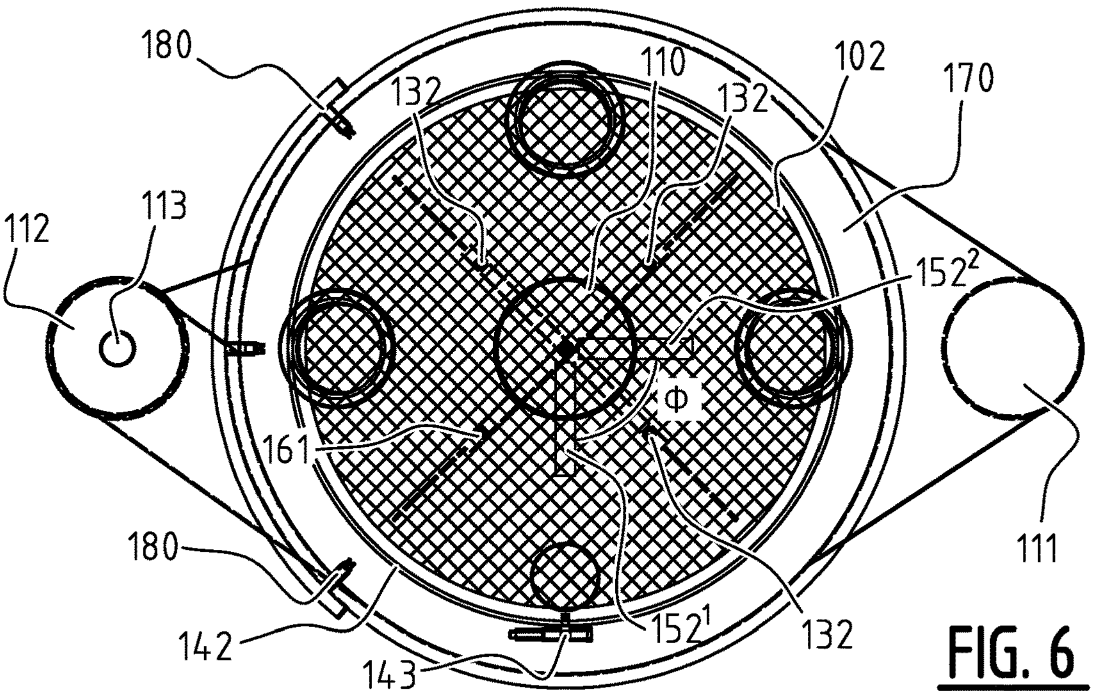
FIG. 6 illustrates a partly transparent top view of the second embodiment.

The separation device 10 may comprises one or more of the separators according to the examples shown in FIGS. 3-6. Preferably one separator is sufficient to replace at least two or even all three of the devices of the three-step separation assembly. Furthermore, the likelihood of a separation device becoming blocked is reduced when any of the separators according to any FIGS. 4-6 is used, as will be explained later.

FIG. 3 illustrates a first example of separator 100 for separating different waste streams. The separator comprises a generally tubular housing 160 in which a separation screen or sieve 102 has been arranged. Centrally in the upper wall of the housing 160 an inlet 110 is provided. In situations wherein the separator is integrated in one of the above-mentioned waste treatments systems 1 or 41 the inlet 110 is connected to and/or forms part of the conduit system 4. The housing 160 further comprises a first (upper) outlet 111 arranged in a side wall 108 of the tubular housing 160 for discharging relatively large particles or objects of the incoming waste stream and a second (lower) outlet 112 arranged at a different circumferential position in the side wall 108 of the tubular housing 160 for discharging relatively small particles, objects and liquid (e.g. water). As can be seen in FIG. 3, the first (upper) outlet is in fluid-connection with a first inner volume of the housing positioned above the screen 102, while the second (lower) outlet 112 is in fluid-connection with a second inner volume positioned below the screen 102. Both the first and second outlet 111, 112 are configured to be connected to conduits, for instance the conduit(s) of the conduit system 1,41 of FIGS. 1 and 2.

The separator 100 of FIG. 3 is configured for separating a stream of material incident on a screen 102 via the inlet 110 in the housing 160. The screen 102 may comprise a wire mesh with a suitable mesh size, i.e. a mesh size large enough to allow passage of relatively small parts of the waste stream (for instance was material including particles and/or objects) while blocking the passage of relatively large parts of the waste stream. Generally the screen 102 is a wire mesh or similar mesh-like structure that can be caused to vibrate so as to transport and distribute the material provided thereon in radial directions and/or in a circumferential direction, as explained hereafter.

An incoming waste stream, for instance a waste stream from any of the inlets 2,2' may enter the separator through the inlet 110. The inlet is configured to drop the waste stream in an axially downward direction (Pd) in the centre of the screen 102 so as to cause an even distribution of the waste stream over the upper surface of the screen 102. During operation, the screen 102 is caused to vibrate by a drive unit (not shown) so as to urge the waste on the screen 102 to move in radial direction and/or in a circumferential direction, depending on the manner in which the screen 102 is vibrating. Waste material is provided on the screening surface vibrated mechanically at high speeds from the inlet 110 and then a mechanical screening process takes place wherein the waste material is separated according to particle/object size depending on the mesh size of the screen 102. In other words, during operation of the separator, the separator keeps a first portion of the waste material that has such a size that it does not pass through the screen 102, in the first (upper) volume above the screen 102 and guides this waste material towards the first outlet 111, while allowing a second portion of material that comprises material having a size such that it may pass through the screen 102, to pass through the screen 102 to be guided towards the second outlet 112.

The housing 160 of the separator is supported on a base 161. The base 161 in turn can be supported on any surface, such as a floor. The housing 160 is constructed of a plurality of housing portions or stages that can be releasably joined by a plurality of straps 140 with appropriate locking mechanisms 141 such as a screw lock mechanism. Further, the separator comprises a control unit 154 configured to control the drive unit for driving the vibrational movement of the screen 102. The control unit 154 may for example comprise a manual switch, an on switch, an off switch, an emergency stop switch and/or the like. The control unit 154 may be arranged on an outer side of a base 161. The base 161 is configured to support the (housing 160 of the) separator on a plurality of springs 153 arranged in an array along the circumferential bottom edge of the tubular housing 160 in order to support the housing 160 in a vibration-damping manner.

As will be explained hereafter in more detail, the screen 102 may, during operation, vibrate such that these vibrations force the first portion of waste material to be transported from the center of the screen 102 to a peripheral edge thereof such that said first portion of material is forced in the direction of an upright housing side wall 104. In the example of FIG. 3 the screen 102 is sized so that the upright tubular side wall part of the tubular housing 160 directly borders the peripheral edge of the screen 102. The side wall 104 therefore prevents further radial movement of the waste material. The (first portion of) material ending up close to or against the bordering side wall 104 is caused to move in a circumferential direction by a proper circular vibration of the screen 102 and eventually enters the first (upper) outlet 111 arranged in the side wall 104. The first portion of waste material then may be guided further into the conduit system for further handling. The second portion of waste material that has passed through the screen 102 may be collected on a downstream portion of the separator and then transported towards the second (lower) outlet 112. In this manner the incoming waste stream may be separated into two streams of different particle/object size.

Although the separator of FIG. 3 may properly separate the incoming waste stream into two waste streams sorted in accordance with the mesh size of the screen, the separator has still the disadvantage that unusually large objects (items), such as, for example, clothing, towels, travelling towards the first outlet 111 may clog the screen 102. As such, a system as in FIG. 1 may need further pre-filtering method to remove such large items from the stream since the system itself may not be suited for filtering streams wherein large items may be comprised.

Hence there is a need for a separator that is configured to adequately separate a stream wherein large items may be comprised. Such separator is shown in FIGS. 4-6. The figures show a second embodiment of a separator which for most part corresponds to the separator according to the first embodiment described in connection with FIG. 3. Therefore a detailed description of several details of the separator has been dispensed with. Furthermore, in order not to obscure the disclosure, the same description as discussed in the light of FIG. 3 is not repeated here, however, the same description applies where appropriate.

The separator according to FIGS. 4-6 has been modified to such an extent that the risk of malfunctioning of the separator, for instance due to clogging or obstruction by large items that mistakenly have been entered into the waste handling system. For instance, the separator 100 comprises a tubular housing 160 in the interior of which a screen 102 has been arranged. In the shown embodiment the screen 102 extends orthogonally with respect to the axial direction of the separator 100, but has a smaller diameter than the diameter of the tubular side wall 108 of the housing 160 (and therefore the diameter of screen 102 is smaller than the diameter of the screen 102 shown in FIG. 3). In other words, an annular gap 170 is present between the inner surface of the tubular side wall 108 of the housing 160 and the peripheral edge 115 of the screen 102.

Again, the housing 160 may constitute of a plurality of stages joined by one or more straps 140 with locking means 141, such as, for example, a screw lock mechanism. This may be beneficial for inspecting, maintaining, assembling, de-assembling purposes or the like. Furthermore, the side wall 108 of the housing 160 may be provided with one or more liquid injection heads 180 (cf. FIG. 5) of a liquid injection system. These liquid injection heads 180 are arranged to be able to clean a collecting surface 114 (to be described later) of a collector 109 that is configured to collect the solid-like first waste stream during operation of the separator 100.

The screen 102 is arranged over the inlet opening 134 of a receptacle 103 arranged centrally in the separator (more specifically, coaxially with the tubular housing 160). This inlet is configured to receive the second waste stream 122 and guide the received second waste stream 122 towards the second (lower) outlet 112. The receptacle 103 (arranged downstream of the screen 102) is carried by a support 130. The upper surface of support 130 has a curved surface, e.g. convex-like surface, and is positioned so as to properly receive the second waste stream 122 arriving from the inlet opening and to force the material of the second waste stream 122 radially outwards in the direction of the second outlet 112. Preferably the upper surface 130 has a spherical shape or at least a convex shape arranged coaxially with the receptacle 103. Furthermore, a drive unit 150 (FIG. 5) for causing vibration of the support 130 and of the receptacle 103 carried thereon is connected to the bottom side of this support 130. The screen 102 is fixedly mounted to the upper portion of the receptacle 103 using a screen strap 142 (cf. FIGS. 5 and 6) that is locked using locking means 143, such as, for example, a screw lock mechanism. This allows the screen 102 to be removed, replaced, and inspected or the like if the locking means 143 is unlocked. Since the screen 102 is fixedly mounted to the receptacle 103, any vibration brought about in the receptacle 103 will be passed onto the screen 102 as well.

The receptacle 103 further comprises a collecting surface 114 (for instance a flat bottom plate arranged at an inclination) partially or, preferably, fully arranged downstream of the screen 102 and configured to receive the first waste stream 121 and allow the first waste stream to move downward under the influence under the influence of gravity and assisted by the vibrations imparted on the collecting surface 114. In any way, the collecting surface 114 should extend at an inclination, i.e. obliquely to some extent with respect to the direction of gravity, so as to urge the waste stream downwards towards the first outlet 111. Preferably, the lower portion of the collecting surface 114 coincides with the position of the first outlet 111 such that the material of the first waste stream 121 is forced in the direction of the first outlet 111.

In certain embodiments the lower portion of the receptacle 103 may have a reduced diameter with respect to the diameter of the upper portion of the receptacle 103 in order to provide sufficient volume for the first waste stream 121 on the collecting surface 114, as illustrated in FIG. 4.

Furthermore, the housing 160 stands free from the vibrating screen 102, vibrating receptacle (103) and vibrating support (130). This allow the mesh screen (102) to be freely vibrated in transversal direction (and in some embodiments at the same moment in axial directions as well). During the vibration in transversal and/or axial direction the mesh screen edge does not come into contact with the housing. As shown in the drawings, especially in FIG. 5, the housing 160 is connected to the support 130 and the support is carried on the base 161 via a plurality of springs 153 or spring-like elements. The drive unit 150 is fixedly mounted to the support 130. The drive unit 150 may further be connected via a wired or wireless connection to the control unit 154. The drive unit 150 comprises a drive shaft 155 that can be rotatably driven by an electric motor 156. At the upper and lower ends of the drive shaft 155 two eccentrically mounted (variable) weights $\mathbf{152}^1$,$\mathbf{152}^2$ are arranged. The first (top) weight $\mathbf{152}^1$ is arranged at the upper end of the drive shaft 155 and is configured to set the horizontal vibration motion of the support 130 (and thereby of the receptacle 103 and screen 102 connected thereto). The transversal vibration motion (i.e. the horizontal vibration motion if the separator is oriented in upright position) determines the radial velocity of motion of waste material from the centre of the screen 102 to the peripheral edge thereof. Adding more weight to the first (top) weight $\mathbf{152}^1$ increases the transversal vibration motion. The second (bottom) weight $\mathbf{152}^2$ is arranged at the bottom end of the drive shaft 155 and is configured to set the set the axial vibration motion of the support 130 (and thereby of the receptacle 103 and screen 102 connected thereto). The axial vibration motion corresponds to a vertical vibration motion if the separator is oriented in upright position determines circumferential velocity of the waste material on the screen. The circumferential motion of the waste on the screen 102 not only depends on the actual weight (more weight means a larger axial vibration amplitude), but also on the angle φ with respect to which the second (bottom) weight is oriented relative to the first (upper) weight. The angle φ can be varied thereby varying the circumferential motion of the waste material on top of the screen 102. The velocity of the material on the screen 102 increases with an increasing angle φ. When the first and second weights $\mathbf{152}^1$,$\mathbf{152}^2$ are "in phase", the waste material will be directly moved in radial direction to the peripheral edge of the screen. At an increased angle φ, the circumferential velocity (i.e. the tangential velocity) increases.

More generally, it may be possible to bring about a motion that is both substantially circular in the plane of the screen 102 as substantially linear in the direction perpendicular to the screen 102. The former vibration motion is bound to force the waste material on the screen 102 to be transported to the peripheral edge thereof, whereas the latter vibration motion will force waste material on the screen 102 in the direction perpendicular to the screen 102. The combined motion may cause the waste material to be moved over the upper surface of the screen 102 in such a manner that waste material will either fall through the screen 102 or be transported to the peripheral edge of the screen and fall in the gap 170 between the screen 102 and the housing 160.

In operation, the separator 100 separates an incoming waste stream 120 (cf. FIG. 4) comprising a mixture of a first waste portion including relatively large particles, objects and/or items (indicated in FIG. 4 by a number of circles) and a second waste portion including relatively small particles, objects and/items (indicated in the same figure by a number of dotted and straight lines) and arriving at the inlet 110 into a first waste stream 121 primarily containing the first waste portion and a second waste stream 122 primarily containing the second waste portion. The screen 102 is caused to vibrate such that these vibrations force the first waste stream 121 to be transported from a centre of the screen 102 to the peripheral edge thereof such that said first waste stream 121 may fall from the edge of the screen 102 into the gap 170 existing between the peripheral edge and the inner surface of the tubular side wall of the housing 160.

Since the peripheral edge 115 of the screen 102 is not connected to the housing 160 at the position of the screen 102, it is freely movable relative to the housing, without making contact with the housing). Furthermore, since there is no connection between the screen 102 and the housing, a gap 170 between the screen and the housing exists that is not interrupted by any construction element, like a connection element. A uninterrupted passage is therefore formed wherein also relatively large objects like towels and tissues can be discharged, thereby avoiding clogging of the separator. Mores specifically, the first waste stream is allowed to fall off the screen 102 at any position along the peripheral edge of the screen 102. Thereby accumulation of material from the first waste stream 121 near the screen 102 is prevented which might otherwise block the screen 102, inlet 110 and/or outlet(s) 111/112. The first waste stream 121, when falling from the peripheral edge of the screen 102 may be collected on a collecting surface 114 of collector (109) arranged downstream of the screen. The collector (109) and its collecting surface (114) may be fixedly connected to the housing, possibly at the same time also essentially free from any connection with the screen (102), vibrating receptacle (103) and/or vibrating support (130). Even in case of very large items, such as towels, in the incoming waste stream, the risk of the separator 100 becoming blocked is reduced: the very large object will also fall in the gap and be caught by the collecting surface 114. The very large object may be moved to the outlet 111 but even if the very large object has the tendency to stay between screen 102 and the housing 160 (i.e. in the gap 170), the separation action of the screen 102 is not impeded and the separation process of the separator 100 may be continued. Once in a while (for instance in time intervals of a couple of days or weeks) the receptacle 103 of the separator 100 may be cleaned and the very large object may be removed therefrom. As mentioned earlier, the construction of the separator makes it easy to access the interior of the separator, especially the receptacle 103, so that maintenance and cleaning can take place in an efficient and easy manner.

In the shown embodiment the screen 102 is only supported by the support 130 and the receptacle 103 arranged below the screen 102, there are no connections between the screen 102 and the side wall 108 of the housing 160. The gap 170 between the screen 102 and the side wall 108 therefore is free of obstacles that would otherwise catch the above-mentioned larger-sized objects thereby impeding the proper operation of the separator.

The second waste stream 122 passing through the screen 102 enters the inlet opening 134 of the receptacle 103 and is received in the interior passage provided inside the receptacle 103. The inner passage of the receptacle 103 is configured to maintain the second waste stream 122 therein, that is, the inner passage is not open such that waste material cannot flow from the collecting surface 114 (being outside the receptacle 103) to the inner portion of the receptacle 103 or vice versa. The bottom portion of the receptacle 103 is open such that the second waste stream 122 is allowed to flow in the radial direction of the receptacle towards the second outlet 112. To this end, the support 130 and the receptacle 103 are connected to each other using a frame 131, for instance a centre tie down assembly, comprising one or more rods 132 extending in the axial direction of the receptacle 103. This allows the second waste stream 122 to flow over the surface of the support 130 while maintaining a fixed connection between the support 130 and the receptacle 103 to thereby transfer (during operation) the vibrations induced in the drive unit 150 via the support 130, the frame 131 and the receptacle 103 to the screen 102.

To further aid the output of the second waste stream 122 by the second outlet 112, the second outlet 112 may comprise an air vent 113 that is configured to allow air to be sucked into the second outlet 112. In order to prevent unwanted flow of gas from the second outlet 112 to the place wherein the device is located, the air vent 113 may comprise a one-way valve, a manual/automatic switch or the like to prevent airflow from the second outlet 112 to the place where the device is located.

The above variants show that many variants are possible based on the inventive concept. It is possible to add stages and/or to skip stages. All this is covered by the scope of the attached claims and rights are expressly requested for the subject matter of the subclaims, separate from the main claim.

The present disclosure is not limited to the preferred embodiments described above. The scope of protection is determined by the scope of the following claims which allows for a great many modifications.

The invention claimed is:

1. A separator for separating a waste stream comprising liquid constituents, small-sized solid constituents and large-sized solid constituents into a first waste stream comprising the large-sized solid constituents and a second waste stream comprising the liquid and the small-sized solid constituents, the separator comprising:

a stationary base;

a housing fixedly connected to the stationary base, the housing comprising an inlet for supply of the waste stream to be separated, a first outlet for discharge of the first waste stream and a second outlet for discharge of the second waste stream;

a vibrating mesh screen arranged inside the housing downstream of the inlet for receiving on a vibrating mesh screen surface the waste stream to be separated, wherein the vibrating mesh screen is configured to be vibrated in order to move the waste stream over the vibrating mesh screen surface, wherein a mesh size of the vibrating mesh screen is selected to allow passage of the liquid and small-sized solid constituents towards a receptacle inlet opening and to move the large-sized solid constituents over the vibrating mesh screen surface towards a peripheral edge of the vibrating mesh screen;

a vibrating receptacle arranged inside the housing downstream of the vibrating mesh screen and connected to the vibrating mesh screen, the vibrating receptacle comprising a receptacle inlet opening and a receptacle passage for receiving the second waste stream having passed the vibrating mesh screen and for guiding the second waste stream towards the second outlet, respectively;

a vibrating support fixedly connected to the vibrating receptacle, the vibrating support being spring-mounted on the stationary base;

a drive unit mounted to the vibrating support, the drive unit being configured to induce vibration to the vibrating support and to the vibrating receptacle and vibrating mesh screen connected thereto, wherein the mutually connected vibrating mesh screen, vibrating receptacle, and vibrating support are arranged to be vibrateable with respect to the stationary base and the housing; and a collector arranged inside the housing downstream of the vibrating mesh screen, the collector comprising a collecting surface for collecting the large-sized solid constituents of the first waste stream and discharging the large-sized solid constituents of the first waste stream towards the first outlet;

wherein the vibrating mesh screen is sized and positioned to provide a gap between the peripheral edge of the vibrating mesh screen and a side wall of the housing connected to the stationary base, allowing the large-sized solid constituents of the first waste stream to drop onto the collecting surface of the collector.

2. The separator as claimed in claim 1, wherein the vibration that the drive unit is configured to induce is a recurrent vibration with a circular motion in a plane parallel to an interface of the screen, and wherein the gap extends along the entire screen edge to allow the large-sized solid constituents to drop from the vibrating mesh screen at any position along the peripheral edge thereof.

3. The separator as claimed in claim 1, wherein the vibrating mesh screen, the vibrating receptacle and the vibrating support are freestanding relative to the housing.

4. The separator as claimed in claim 1, wherein the vibrating mesh screen is mounted in the housing in a manner allowing the vibrating mesh screen to vibrate freely in a transversal direction, without the peripheral edge of the vibrating mesh screen making contact with the side wall of the housing.

5. The separator as claimed in claim 1, wherein the collector and the collecting surface are fixedly connected to the housing and/or free from connection with the vibrating mesh screen, the vibrating receptacle and the vibrating support.

6. The separator as claimed in claim 1, wherein the drive unit is configured to cause the vibrating mesh screen, the vibrating receptacle and the vibrating support to vibrate in both a transversal vibration motion and an axial vibration motion.

7. The separator as claimed in claim 1, wherein the housing is cylindrical and the vibrating mesh screen is arranged to extend orthogonally with respect to a cylinder axis.

8. The separator as claimed in claim 1, wherein when the housing has a circular cross-section and the gap is an annular opening bordering an inner surface of the housing.

9. The separator as claimed in any of the preceding claims, wherein the vibrating mesh screen is configured to block the large-sized solid constituents in the waste stream to be separated, while allowing the liquid constituents and the small-sized solid constituents to go through.

10. The separator as claimed in claim 1, wherein the drive unit comprises an electric motor and a rotatable drive shaft, and wherein a first and second eccentrically arranged weights are connected to the rotatable drive shaft so as to cause a vibration when the drive unit is activated.

11. The separator as claimed in claim 1, wherein the drive unit is configured to vibrate the vibrating mesh screen to urge a waste material arriving from the inlet to move in an outward radial direction.

12. The separator as claimed in claim 1, wherein the waste stream comprises at least a mixture of feces, urine, medicinal substance and/or toxic substance, and large-sized solid constituents formed by containers or shredded container material.

13. The separator as claimed in claim 1, wherein the vibrating receptacle is fixedly connected to the vibrating support only at a bottom portion of the vibrating receptacle, and wherein vibration of the vibrating support is caused by the drive unit connected thereto.

14. The separator as claimed in claim 1, wherein the vibrating support has a plate-like structure.

15. The separator as claimed in claim 1, wherein the vibrating receptacle is connected to the vibrating support using a frame, the frame comprising at least three rods extending in an axial direction of the vibrating receptacle to thereby connect the vibrating support to the vibrating receptacle.

16. The separator as claimed in claim 15, wherein the collecting surface of the collector is arranged to surround the vibrating receptacle downstream of the vibrating mesh screen, and wherein the collecting surface of the collector is mounted to the side wall of the housing and/or extends obliquely relative to the axial direction.

17. The separator as claimed in claim 1, wherein an upper portion of the vibrating receptacle has a greater radial cross-section than a radial cross-section of a lower portion of the vibrating receptacle.

18. The separator of claim 11, wherein the drive unit is further configured to vibrate the vibrating mesh screen to additionally urge the waste material to move in a circumferential direction.

* * * * *